United States Patent
Gois, Sr.

(10) Patent No.: US 8,141,228 B2
(45) Date of Patent: Mar. 27, 2012

(54) FORCE RESISTANT PURSE RING

(76) Inventor: John F. Gois, Sr., La Mesa, CA (US)

( * ) Notice: Subject to any disclaimer, the term of this patent is extended or adjusted under 35 U.S.C. 154(b) by 410 days.

(21) Appl. No.: 12/404,967

(22) Filed: Mar. 16, 2009

(65) Prior Publication Data

US 2010/0229364 A1    Sep. 16, 2010

(51) Int. Cl.
*B23P 11/00* (2006.01)
*A01K 73/12* (2006.01)

(52) U.S. Cl. .......................... 29/525.01; 43/14

(58) Field of Classification Search .............. 29/525.01, 29/428, 7; 43/14; 24/579.11, 600.2, 599.9; 294/77, 82.21
See application file for complete search history.

(56) References Cited

U.S. PATENT DOCUMENTS

| | | | |
|---|---|---|---|
| 240,132 A | 4/1881 | Howe | |
| 1,473,983 A | 11/1923 | White | |
| 1,508,705 A | 9/1924 | Mahan | |
| 3,064,384 A | 11/1962 | Lewis et al. | |
| 3,789,532 A | 2/1974 | Ferguson | |
| 4,380,882 A | 4/1983 | Flammini | |
| 5,018,295 A * | 5/1991 | Taylor et al. | 43/14 |
| 5,287,645 A | 2/1994 | Gois | |
| 7,743,475 B2 * | 6/2010 | Jang et al. | 24/599.9 |
| 2010/0088945 A1 * | 4/2010 | Gois | 43/14 |

* cited by examiner

*Primary Examiner* — John C Hong
(74) *Attorney, Agent, or Firm* — Nydegger & Associates

(57) ABSTRACT

A method for manufacturing a purse ring is disclosed. In the method, a heat-treated steel frame interrupted by a gap is fabricated to partially circumscribe a passageway. At the edges of the gap, the frame includes a pivot mount and a push button biased to extend from an aperture are separated by a gap distance. Also, a heat-treated steel pivot arm is connected to the pivot mount. Structurally, the arm forms a key guide that terminates at a stop. In the method, a heat-treated steel sleeve forms a channel to slidably receive the arm. Also, the sleeve includes a key that slides within the guide to limit movement between the sleeve and the arm. Further, the sleeve includes a lateral opening that receives the push button to limit the maximum distance between the pivot member and the lateral opening to be substantially equal to the gap distance.

22 Claims, 4 Drawing Sheets

FORCE RESISTANT PURSE RING

FIELD OF THE INVENTION

The present invention pertains to seine equipment used in fishing operations. More specifically, the present invention pertains to purse rings which connect the fishing net to a pursing cable or purse line. The present invention is particularly, but not exclusively, useful for the manufacture of purse rings that are able to withstand great forces without deforming or exhibiting excessive wear.

BACKGROUND OF THE INVENTION

In commercial fishing operations, the method of fishing known as purse seine fishing is an effective and widely used technique. The method is conceptually simple. A seine, or net, is fitted at one end with buoyant devices (e.g. floats) and is fitted at the other end with weighting devices (e.g. sinkers). As the seine is deployed in a rough circle, the weighted end of the seine submerges to cause the seine to hang essentially vertically in the water. To provide for seine retrieval, a purse line is attached to the weighted end of the seine by a plurality of connectors, known as purse rings. As the purse line is tightened by fishermen on the fishing vessel, the weighted end of the seine is drawn together to enclose fish within the seine. The weighted end, now pursed, is raised and drawn toward the fishing vessel. Simultaneously, support craft retrieve and draw in the buoyed end of the seine. In this way, fish are trapped in the seine as it is retrieved.

During seine retrieval, the purse line, through its interaction with the purse rings, is used to both purse the seine and draw it toward the fishing vessel. As can be easily imagined, the forces which are generated between the purse line and the purse ring during these operations can be very substantial. Indeed, these forces can create significant strain on components within the purse ring and lead to deformation and, eventually, a complete failure of the purse rings and a fraying of the purse line which causes the purse line to snag on the netting. In either event, the operation is compromised and the purse rings may need to be replaced.

Recent developments in the commercial fishing area have compounded the problem of purse ring wear because many of the now preferred fishing grounds are located in the Western Pacific Ocean. It happens, however, that purse seiner operations in the Western Pacific require deeper deployment of the seines than in other Pacific areas, because thermoclines in the Western Pacific often result in deeper schooling of food fish. Consequently, with the deployment of seines, the forces required to retrieve the seines (e.g. forces between the purse line and the purse rings) are greatly increased for longer periods of time. As a further consequence, standard purse rings, such as are used in other oceans of the world, are generally inadequate for use in the Western Pacific.

In light of the foregoing, the present invention recognizes the need to significantly increase the durability of purse ring components against significant strain forces, to permit efficient seiner operations at greater depths in the ocean, and to prolong the useful life of purse rings used in seiner operations regardless of depth. It is therefore an object of the present invention to provide a method of manufacturing purse rings for use in purse seiner fishing operations which has a relatively long period of usefulness. It is a further object of the present invention to provide a method for manufacturing purse rings for seiner operations that reduce tolerances between moveable components in the purse ring. It is yet a further object of the present invention to provide a method for manufacturing purse rings for use in purse seiner operations that utilize heat-treated and hardened steel components. Another object of the present invention is to provide a method for manufacturing purse rings for purse seiner fishing operations which is relatively easy perform, which is comparatively cost-effective, and which results in purse rings having improved strength.

SUMMARY OF THE INVENTION

In the present invention, a method for manufacturing a purse ring for use in deep-sea fishing operations is provided. In the method, a C-shaped, oblong steel frame is fabricated to circumscribe a passageway. Though oblong, the frame can be considered to have a proximal end and a distal end that are interconnected by a first side and a second side. As a C-shaped structure, the second side is interrupted by a gap that is defined by a first edge and a second edge. For purposes of the present invention, a pivot mount, such as a slot, is positioned at the first edge. Further, an aperture is formed at the second edge. Importantly, the pivot mount at the first edge and the aperture at the second edge are separated by a gap distance.

In addition to the frame, a steel push button lock or locking pin is manufactured and biased to extend from the aperture at the second edge of the gap. Further, a steel pivot arm is formed and pivotably mounted to the pivot mount on the first edge of the gap. As a result, the pivot arm is able to close and open the passageway. Structurally, the pivot arm has a first end and a second end, and the first end includes a pivot member, such as a pivot pin, connected to the pivot mount. Further, the pivot arm defines a key guide that terminates at a key guide stop near the second end.

In the method of the present invention, a steel sleeve is connected to the pivot arm via the key guide. Specifically, the sleeve forms a channel that defines an axis and slidably receives the pivot arm. In order to limit relative movement between the sleeve and pivot arm, a key or bolt is connected to the sleeve and passes through the key guide. Further, the sleeve forms a lateral opening. During use, the sleeve has a retracted position in which it rides over the first end of the pivot arm. Also, the sleeve has a fully extended position in which the lateral opening receives the push button lock and the key abuts the key guide stop, limiting the maximum distance between the pivot member at the first end of the pivot arm and the lateral opening to be substantially equal to the gap distance.

During manufacturing of the purse ring, the components are engineered to have as little tolerance as possible. Specifically, the tolerance between the gap distance and the maximum distance is plus or minus about three-thousandths of an inch. Thereafter, each component is heat-treated and hardened to increase strength and durability. With these manufacturing standards, the shear strength of the push button lock, key and pivot member are sufficient to prevent deformation of the first side of the frame when external forces are applied to pull the first end and the second end of the frame away from one another.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
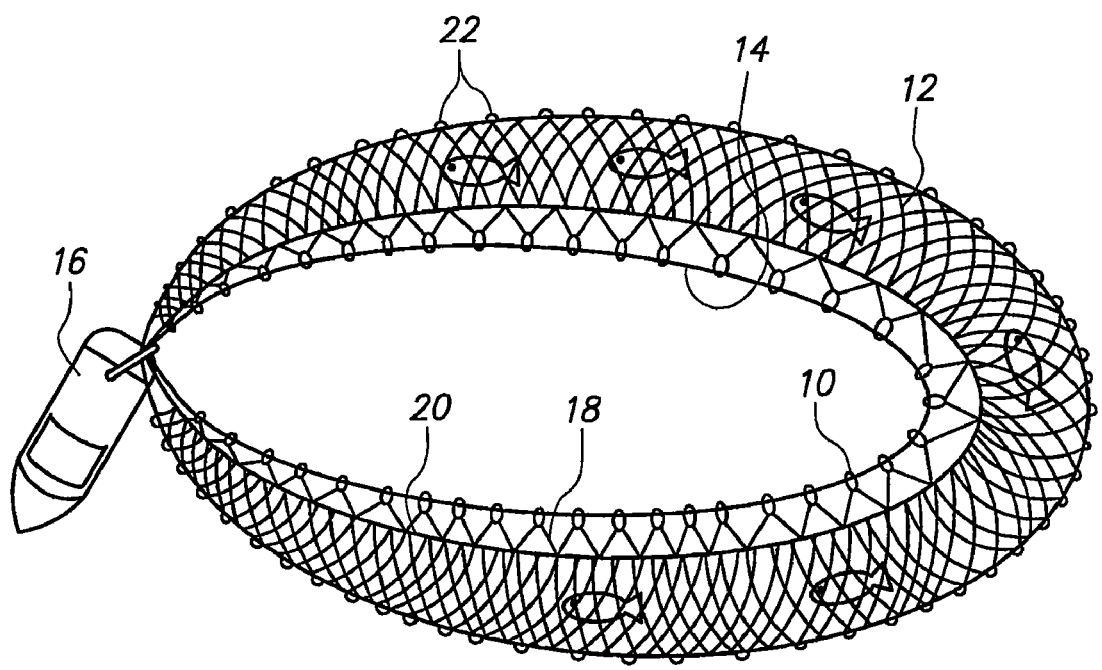
FIG. 1 is a top view of a fishing vessel engaged in seiner operations.

FIG. 1 shows a top overhead view of a purse seiner in operation using a plurality of purse rings designated 10. As shown, the purse rings 10 interconnect a seine 12 and a purse line 14 during the fishing operations conducted by a seiner vessel 16. For purposes of the present invention, it is to be appreciated that the purse line 14 will most likely be a cable. More specifically, purse rings 10 are attached to the seine 12 with bridle lines 18 which are, in turn, attached to the seine 12 by a chain 20. Similar to the various embodiments for the purse line 14, the bridle lines 18 may be cables, ropes or chains. Further, floats 22 are connected to the seine 12 to provide buoyancy to maintain one side of the seine 12 at or near the water's surface. At the same time, the chain 20 and purse rings 10 act as sinkers to vertically orient the seine 12. As a result, the seine 12 is positioned to encircle schools of fish. When fish are encircled, they may be caught by pursing and retrieving the seine 12. This requires the interaction of purse line 14 with the plurality of purse rings 10.

Figure 2A:
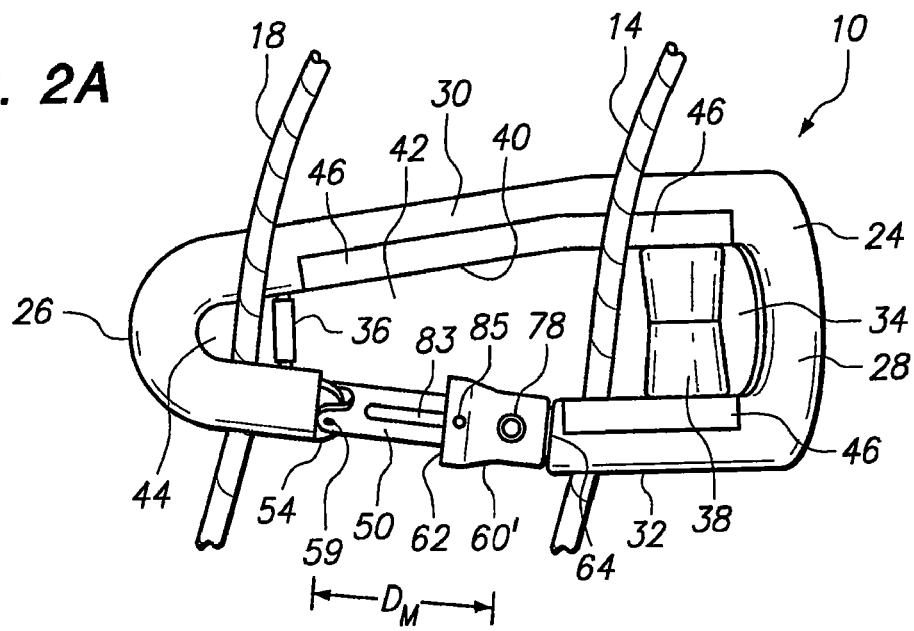
FIG. 2A is a top view of the preferred embodiment of the purse ring engaged with a bridle line and purse line and showing the cable release arm in its closed configuration.
Figure 2B:
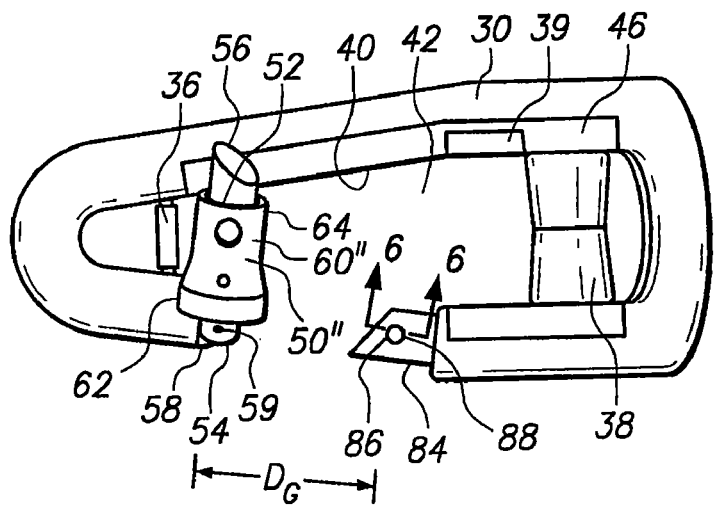
FIG. 2B is a top view of the purse ring of FIG. 2A with the cable release arm in its open configuration.
Figure 2C:
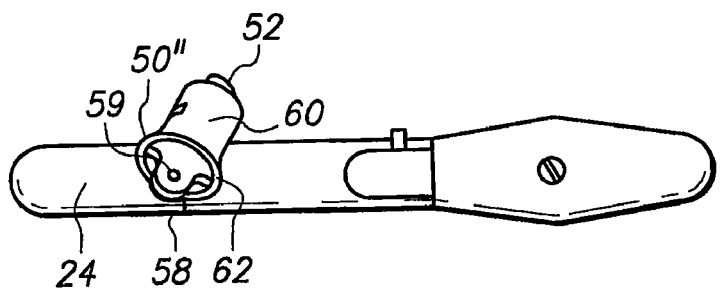
FIG. 2C is a side view of the purse ring of FIG. 2B.

In FIG. 2A, a more detailed perspective view of an individual purse ring 10 is provided. As shown in FIGS. 2A, 2B and 2C, purse ring 10 comprises a frame 24 which may generally be of any shape that is efficient for connecting purse line 14 to bridle line 18. As depicted, the preferred ring 10 is substantially oblong in shape. Also, purse ring 10 is made of hardened steel and should be hard enough to resist frictional wear. Further, the elements of purse ring 10 should be chemically compatible with each other and with the materials of other components of seiner operations so as to minimize the effects of corrosion.

Still referring to FIG. 2A, it can be seen that frame 24 includes a proximal end 26 and a distal end 28. Further, two sides 30 and 32 interconnect the ends 26, 28 to define an aperture 34. As shown in FIG. 2A, the ring 10 includes a proximal roller 36 that interconnects the sides 30, 32 and bridges the aperture 34. Also, the ring 10 includes a distal roller 38 that further interconnects the sides 30, 32. With this structure, it can be seen that the sides 30, 32 and the rollers 36, 38 define a periphery 40 around a passageway 42 that receives the purse line 14. Further, the proximal end 26 and proximal roller 36 form an opening 44 for receiving the bridle line 18. Typically, during pursing operations, the purse line 14 rides along the distal roller 38 and the sides 30, 32 adjacent the distal roller 38. Therefore, the purse ring 10 is provided with hard facing 46 along both sides 30, 32 adjacent the distal roller 38. Along the side 30, this hard facing 46 effectively extends from the proximal roller 36 to the distal roller 38. For purposes of the present invention, the hard facing 46 is comprised of at least one layer of a metal having improved strength and wear resistance such as Tube Alloy 240-O manufactured by McKay. Further, the hard facing 46 is preferably austempered to provide an even tougher and more wear resistant surface with less distortion.

As shown in FIG. 2A, the proximal roller 36 is cylindrical. Further, the distal roller 38 is substantially cylindrical, but includes a slight taper toward its center to form a guide which facilitates a more efficient rolling contact of the distal roller 38 with purse line 14. Further, each roller 36, 38 is connected to frame 24 to provide for substantially free rotation and consequent reduced frictional wear during use.

In FIG. 2B, the illustrated embodiment of the purse ring 10 includes a side roller 39 mounted for rotation on the side 30. Structurally, the side roller 39 has an axis of rotation that is substantially perpendicular to the axis of rotation for the rollers 36, 38.

Cross-referencing FIG. 2A with FIGS. 2B and 2C, the ring 10 is shown to include a canted cable release arm 50 along the side 32 of the frame 24. Structurally, the canted cable release arm 50 includes a pivot arm 52 which is formed with an end 54 and an end 56 (see FIG. 2B). As shown in FIG. 2C, the frame 24 includes an extension 58 that is canted with respect to the frame 24. Further, the pivot arm 52 is pivotably mounted to the extension 58 via a pivot mount or pin 59. With this engagement, the pivot arm 52 is able to clear the side 30 of the frame 24 as it pivots from the closed configuration 50 shown in FIG. 2A to the open configuration 50" shown in FIGS. 2B and 2C. As shown, the pivot arm 52 is able to clear the side 30 of the frame 24 and pivot inwardly toward the proximal roller 36 until the pivot arm 52 is substantially parallel to the proximal roller 36. It will be appreciated that when pivot arm 52 is pivoted to the open configuration 50", it interrupts the periphery 40 to allow the purse line 14 to be moved into and out of the passageway 42.

Figure 3A:
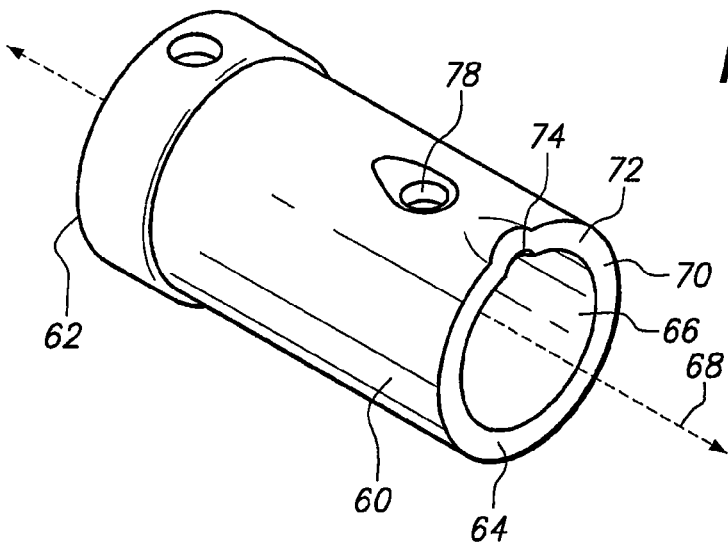
FIG. 3A is a perspective view of the sleeve in the purse ring shown in FIGS. 2A-2C.
Figure 3B:
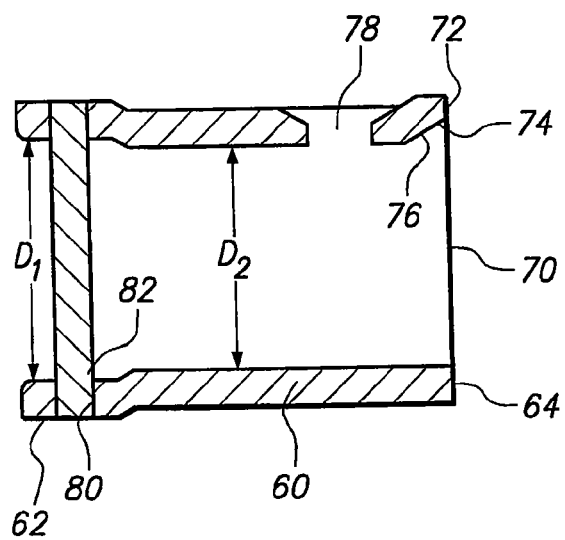
FIG. 3B is a cross sectional view of the sleeve of FIG. 3A.

Further, the cable release arm 50 is provided with a sleeve 60 that has a flared proximal end 62 and a distal end 64. Referring to FIGS. 3A and 3B, the structure of the sleeve 60 may be more easily understood. As illustrated, the sleeve 60 forms a channel 66 that extends along an axis 68 from the proximal end 62 to the distal end 64. As seen in FIGS. 2A-2C, the channel 66 slidably receives the pivot arm 52. As shown in FIG. 3A, at its distal end 64, the sleeve 60 has an end face 70 with a surface 72 that is substantially perpendicular to the axis 68. As shown, a notch 74 is formed in the sleeve 60 at the end face 70. Referring to FIG. 3B, it may be seen that the notch 74 includes a sloping surface 76 that forms an angle of about forty-five degrees with the end face surface 72.

As seen in FIGS. 3A and 3B, the sleeve 60 also forms a lateral opening 78 to the channel 66. Importantly, this lateral opening 78 is axially aligned with the notch 74 as detailed below. Also, as perhaps best seen in FIG. 3A, the lateral opening 78 is flared with an oblong recess to facilitate operational access to the locking pin 86 (See FIG. 3A). Further, the sleeve 60 includes apertures 80 for receiving a key or bolt 82 to engage the sleeve 60 with the pivot arm 52 as shown in FIGS. 2A-2C. Specifically, the pivot arm 52 forms a key guide 83 that slidingly receives the bolt 82. Axial movement of the bolt 82 in the key guide 83 is limited by a stop 85. In FIG. 3B, it can be seen that the flared proximal end 62 of the sleeve 60 has an inner diameter $D_1$ while the rest of the sleeve 60 has an inner diameter $D_2$, with $D_1 > D_2$.

Referring back to FIG. 2A, the sleeve 60 is shown in an extended position 60' in which the distal end 64 engages the frame 24. Specifically, the frame 24 includes an abutment member 84 (shown in FIG. 2B) that is received within the channel 66 when the cable release arm 50 is in the closed configuration (FIG. 2A) and the sleeve 60 is in the extended position 60'. As a result, the sleeve 60 prevents pivotable movement of the cable release arm 50 when extended about the abutment member 84. Further, the ring 10 provides for the ability to lock the sleeve 60 in the extended position 60'.

As shown in FIG. 2B, the ring 10 provides a locking pin or push button lock 86 on the abutment member 84. Specifically, the locking pin 86 is positioned in an aperture 88 formed in the abutment member 84 and is biased outward from the aperture 88. After the cable release arm 50 is closed, the sleeve 60 may be extended to engage the abutment member 84. During the extension of the sleeve 60, the sloping surface 76 of the notch 74 contacts and automatically depresses the locking pin 86. When the sleeve 60 is fully extended, the locking pin 86 reaches and extends through the lateral opening 78 in the sleeve 60. As a result, the locking pin 86 holds the sleeve 60 in the extended position 60'.

When the sleeve 60 is disengaged from the locking pin 86 and moved to its retracted position 60", the flared proximal end 62 of the sleeve 60 rides over the end 54 of the pivot arm 52. As a result, the sleeve 60 does not interfere with the pivoting capability of the pivot arm 52. This allows the pivot arm 52 to be pivoted to be substantially parallel to the proximal roller 36 and facilitates the removal of the purse line 14 from the passageway 42.

Figure 4:
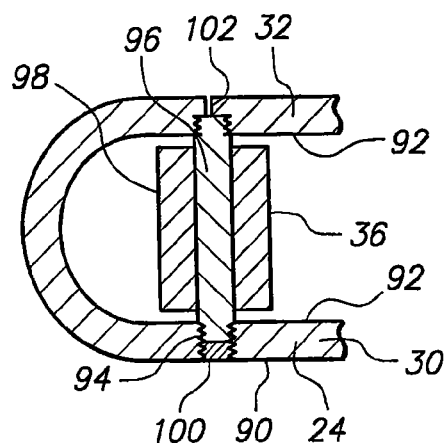
FIG. 4 is a cross sectional view showing the connection between a roller and the frame of the purse ring.

Referring now to FIG. 4, the connection of a roller 36 (or 38) to the frame 24 is illustrated. As shown, the frame 24 may be considered to have an outer face 90 and an inner face 92. For connection with the roller 36, a threaded bore 94 extends from the outer face 90 of a side 30 and through the inner face 92 of the side 30. Further, the threaded bore 94 passes through the inner face 92 of the other side 32 and stops within that side 32. Structurally, the roller 36 includes a threaded shaft 96 that is received within the bore 94 and remains fixed in place during use. Also, the roller 36 includes a bushing 98 that rotates about the fixed shaft 96. As shown, the ring 10 further includes a plug 100 that engages the threads to seal and prevent contamination at the shaft 96. Also, the frame 24 forms a drain aperture 102 that extends from the threaded bore 94 to the outer face 90 of the side 32. In an alternate embodiment, the shaft 96 and bushing 98 can be replaced with a roller pin of a type known in the pertinent art.

In the method for manufacturing a purse ring 10, each purse ring component is fabricated from steel, hardened and heat-treated. As a result, the purse ring components have increased strength and resistance to strain. Further, the components are engineered to have little tolerance, e.g. approximately three-thousandths of an inch, in order to withstand external forces. As shown in FIG. 2B, the frame 24 is fabricated with a gap distance $D_G$ between the pivot mount 59 and the aperture 88. Referring to FIG. 2A, it can be seen that the pivot arm 52 is in its fully extended position, with a maximum distance $D_M$ between the pivot mount 59 and the lateral opening 78. For purposes of the present invention, $D_M$ has a value between $D_G$ and $D_G \pm 0.003$ inch. In the fully extended position, the lateral opening 78 receives and engages the locking pin 86. Further, the bolt 82 abuts and is limited from further movement by the stop 85. Also, the pivot mount 59 provides connection between the pivot arm 52 and the side 32.

Figure 5:
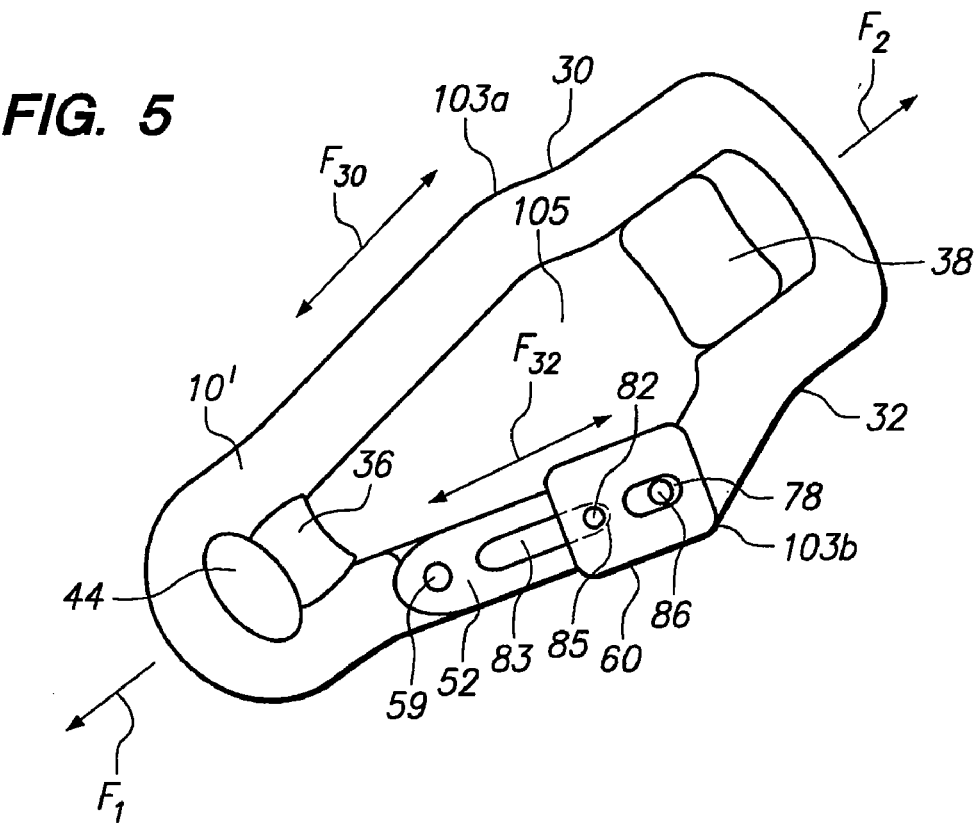
FIG. 5 is a perspective view of an alternate embodiment of the purse ring of FIG. 2A, shown with applied external forces and responsive internal forces.

Referring to FIG. 5, the effect of the small tolerance of the purse ring components may be understood. In this case an alternate embodiment for the purse ring 10' is shown with expanded shoulders 103a and 103b to provide a larger opening 105 in the purse ring 10' for receiving the purse line 14 (See FIG. 2A). Also, the proximal end 26 is bowed for the purse ring 10' to provide a larger opening 44 for receiving the bridle line 18. As shown, regardless which embodiment of purse ring 10 is used, when external forces $F_1$ and $F_2$ are applied to the purse ring 10 or 10' in the normal course of use, reaction forces $F_{30}$ and $F_{32}$ are created in the sides 30, 32 of the purse ring 10. When the pivot arm 52 does not interconnect the side 32, then $F_{32}$ is zero, and $F_{30}$ must counteract $F_1$ and $F_2$. Further, when the side 32 is interconnected, but the interconnection between the side 32, the pivot arm 52 and the sleeve 60 is loose, $F_{30}$ must still counteract $F_1$ and $F_2$. Therefore, a tight fit with little tolerance between the side 32 and the pivot arm 52 at the pivot mount 59, between the pivot arm 59 and the sleeve 60 at the bolt 82 and stop 85, and between the sleeve 60 and the side 32 at the lateral opening 78 and locking pin 86 allows the side 32 to add strength to the purse ring 10 under the forces $F_1$ and $F_2$. As a result, $F_{30}+F_{32}$ may counteract $F_1$ and $F_2$. Therefore, side 30 undergoes far less strain and the service life of the purse ring 10 is increased when side 32 is constructed with little tolerance. Further, the total reactive force $F_{30}+F_{32}$ is increased, allowing the purse ring 10 to withstand the application of greater external forces $F_1$ and $F_2$.

Figure 6:
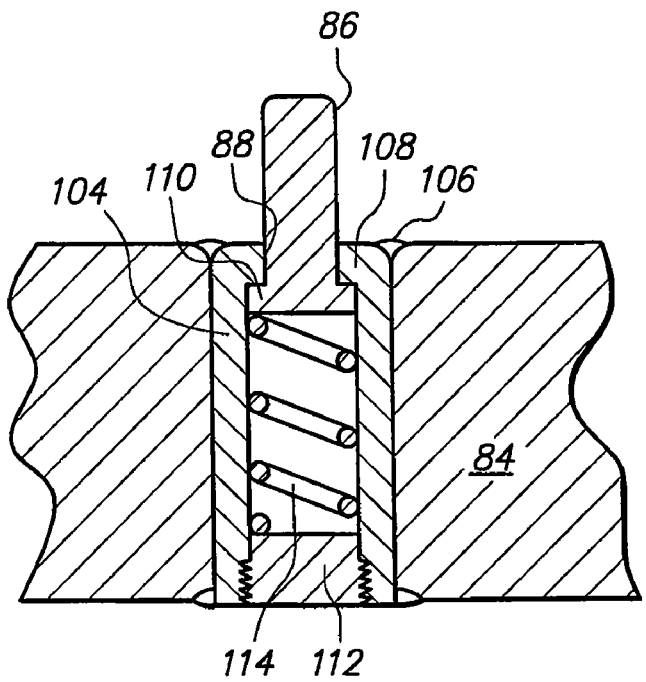
FIG. 6 is a cross-section view of the push button locking pin as seen along the line 6-6 in FIG. 2B.

Referring now to FIG. 6 it will be seen that the push button assembly for locking pin 86 includes a cylinder 104 that is affixed to the abutment member 84 by means such as welding 106. In detail, the cylinder 104 is formed with a shoulder 108 that defines the aperture 88 and the locking pin 86 is formed with a base 110 that abuts the shoulder 108 when the locking pin 86 extends through the aperture 88. There is also a set screw 112 that engages with the cylinder 104 to hold a spring 114 within the cylinder 104 between the set screw 112 and the base 110 of locking pin 86. Thus, with the above assembly, the locking pin 86 can be selectively depressed, against the reactive force of the spring 114, to move the sleeve 60 over the abutment member 84 and then released to engage the locking pin 86 with the sleeve 60. Importantly, in this combination, both the cylinder 104 and the locking pin 86 are made of stainless steel. Thus, there is a stainless steel-in-stainless steel combination that effectively resists the corrosion that would otherwise occur.

While the particular Improved Force Resistant Purse Ring as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A method for manufacturing a purse ring engageable with a bridle line of a seine for pursing the seine with a purse line during deep-sea fishing operations which comprises the steps of:

fabricating an oblong-shaped, heat-treated, steel frame circumscribing a passageway, wherein the frame has a proximal end and a distal end interconnected by a first side and a second side, wherein the second side is interrupted by a gap defined by a first edge and a second edge, wherein a pivot mount is provided at the first edge, wherein an aperture is formed at the second edge, and wherein the pivot mount and the aperture are separated by a gap distance;

biasing a heat-treated steel push button lock to extend from the aperture at the second edge;

pivotably mounting a heat-treated steel pivot arm in the gap of the second side to selectively open and close the passageway, wherein the pivot arm has a first end and a second end, wherein the first end includes a pivot member connected to the pivot mount for movement of the pivot arm, and wherein the pivot arm defines a key guide terminating at a key guide stop; and connecting a heat-treated steel sleeve to the pivot arm, the sleeve having a distal end with an end face formed with a notch and a proximal end and forming a channel defining an axis therebetween for slidably receiving the pivot arm, wherein the sleeve defines a lateral opening to the channel, wherein the sleeve includes a key that rides in the key guide of the pivot arm, wherein the sleeve has a retracted position in which the sleeve rides over the first end of the pivot arm, and wherein the sleeve has a fully extended position in which the notch automatically depresses the push button lock and the lateral opening receives the push button lock prior to the key abutting the key guide stop, limiting the maximum distance between the pivot member at the first end of the pivot arm and the lateral opening to be substantially equal to the gap distance, and wherein the interaction of the lateral opening with the push button and the key abutting the key guide stop are maintained within a tolerance to ensure the establishment of a tight fit when the bridle line of the seine is pursed.

2. A method as recited in claim 1 wherein the tolerance between the gap distance and the maximum distance is approximately three-thousandths of an inch.

3. A method as recited in claim 1 wherein the shear strength of the push button lock, key and pivot member are sufficient to prevent deformation of the first side of the frame when forces are applied to pull the first end and the second end of the frame away from one another.

4. A method as recited in claim 1 further comprising the step of interconnecting the first side and the second side of the frame with a distal roller to bridge the passageway.

5. A method as recited in claim 4 further comprising the step of interconnecting the first side and the second side of the frame with a proximal member to bridge the passageway.

6. A method as recited in claim 4 further comprising the step of mounting a side roller on the first side of the frame adjacent the distal roller to reduce friction between the purse ring and the purse line, with the side roller being transverse to the distal roller.

7. A method as recited in claim 4 wherein the frame has an outer face and an inner face and wherein the method further includes the step of forming at least one threaded bore from the outer face through the inner face of a selected side and through the inner face of the other side, wherein a drain aperture extends from the threaded bore to the outer face of the other side, wherein a selected roller includes a threaded shaft that is received in the bore, and a bushing for spinning on the shaft, and wherein the ring is provided with a plug for sealing the shaft in the bore.

8. A method as recited in claim 1 wherein the proximal end of the sleeve is flared to ride over the first end of the pivot member.

9. A method as recited in claim 1 wherein the frame defines a plane and wherein the pivot arm is canted to move transverse to the plane.

10. A method as recited in claim 1 wherein the pivot mount is a slot and the pivot member is a pin passing through the slot.

11. A method for manufacturing a purse ring engageable with a purse line comprises the steps of:

fabricating a C-shaped steel frame circumscribing a passageway, wherein the frame has a proximal end and a distal end interconnected by a first side and a second side, wherein the second side is interrupted by a gap defined by a first edge and a second edge, wherein a pivot mount is provided at the first edge, wherein an aperture is formed at the second edge, and wherein the pivot mount and the aperture are separated by a gap distance;

biasing a steel push button lock to extend from the aperture at the second edge;

pivotably mounting a steel pivot arm in the gap of the second side, wherein the pivot arm has a first end and a second end and an arm axis therebetween, wherein the first end includes a pivot member connected to the pivot mount for movement of the pivot arm, and wherein the pivot arm defines an axially-extending key guide terminating at a key guide stop;

connecting a steel sleeve to the pivot arm, the sleeve having a distal end with an end face formed with a notch and a proximal end and forming a channel defining a sleeve axis therebetween for slidably receiving the pivot arm, wherein the sleeve defines a lateral opening to the channel, wherein the sleeve includes a key that rides in the key guide of the pivot arm, wherein the sleeve has a retracted position and a fully extended position in which the notch automatically depresses the push button lock and the lateral opening receives the push button lock prior to the key abutting the key guide stop, limiting the maximum distance between the pivot member at the first end of the pivot arm and the lateral opening to be substantially equal to the gap distance, and wherein the interaction of the lateral opening with the push button and the key abutting the key guide stop are maintained within a tolerance to ensure the establishment of a tight fit when an external force acts on the purse ring; and heat-treating the ring to provide sufficient strength to withstand forces encountered in use.

12. A method as recited in claim 11 wherein the tolerance between the gap distance and the maximum distance is approximately three-thousandths of an inch.

13. A method as recited in claim 11 wherein the shear strength of the push button lock, key and pivot member are sufficient to prevent a substantial deformation of the first side of the frame when forces are applied to pull the first end and the second end of the frame away from one another.

14. A method as recited in claim 11 further comprising the step of interconnecting the first side and the second side of the frame with a distal roller to bridge the passageway.

15. A method as recited in claim 14 further comprising the step of interconnecting the first side and the second side of the frame with a proximal member to bridge the passageway.

16. A method as recited in claim 14 further comprising the step of mounting a side roller on the first side of the frame adjacent the distal roller to reduce friction between the purse ring and the purse line, with the side roller being transverse to the distal roller.

17. A method as recited in claim 11 wherein the frame has an outer face and an inner face and wherein the method further includes the step of forming at least one threaded bore from the outer face through the inner face of a selected side and through the inner face of the other side, wherein a drain aperture extends from the threaded bore to the outer face of the other side, wherein a selected roller includes a threaded shaft that is received in the bore, and a bushing for spinning on the shaft, and wherein the ring is provided with a plug for sealing the shaft in the bore.

18. A method as recited in claim 11 wherein the proximal end of the sleeve is flared to ride over the first end of the pivot member.

19. A method as recited in claim 11 wherein the frame defines a plane and wherein the pivot arm is canted to move transverse to the plane.

20. A method as recited in claim 11 wherein the pivot mount is a slot and the pivot member is a pin passing through the slot.

21. A method for manufacturing a purse ring engageable with a bridle line of a seine for pursing the seine with a purse line during deep-sea fishing operations which comprises the steps of:
- fabricating an oblong-shaped frame defining a plane and circumscribing an aperture;
- pivotally mounting a pivot arm onto the frame, wherein the pivot arm defines an axis and has a first end and a slanted second end, and wherein the pivot arm is formed with a key guide terminating at a key guide stop;
- inserting a pivot pin oriented perpendicular to the axis of the pivot arm for attaching the first end of the pivot arm to the frame for a canted rotation of the pivot arm transverse to the plane between a closed configuration, wherein the slanted second end of the pivot arm is juxtaposed with a slant surface on the frame to complete a closed periphery for the frame, and an open configuration wherein the periphery is interrupted by a pivoting movement of the pivot arm transverse to the plane and away from the slant surface on the frame to establish a passageway for moving the purse line into and out of the aperture through the passageway;
- connecting a sleeve to the pivot arm, wherein the sleeve is formed with a channel having a distal end and a flared proximal end, and wherein the sleeve is formed with a lateral opening to the channel and has an end face formed with a notch sloping from the lateral opening to the distal end;
- mounting a bolt on the sleeve to extend through the key guide of the pivot arm, wherein the bolt is oriented perpendicular to the axis of the pivot arm and the sleeve is positioned for reciprocal movement on the pivot arm between an extended position wherein the distal end of the sleeve overrides the slant surface on the frame when the pivot arm is in its closed configuration, and a retracted position wherein the sleeve is withdrawn to release the sleeve from the frame for movement of the pivot arm into its open configuration to interrupt the periphery of the frame; and
- positioning a locking pin in a slot on the frame for reciprocal movement therein between a projected position and a depressed position wherein the pin extends from the slot and into its projected position and is automatically depressed by the notch on the sleeve and retracted into the slot as the sleeve moves into its extended position for insertion of the locking pin into the lateral opening of the sleeve to hold the pivot arm in its closed configuration, wherein the lateral opening receives the locking pin prior to the bolt abutting the key guide stop, wherein the locking pin is oriented substantially perpendicular to the axis of the pivot arm to cooperate with the pivot pin, and with the bolt, in resisting axial forces imposed on the frame through the pivot arm, and wherein the interaction of the lateral opening with the locking pin and the bolt abutting the key guide stop are maintained within a tolerance to ensure the establishment of a tight fit when the bridle line of the seine is pursed.

22. A method as recited in claim 21 wherein the frame has a proximal end and a distal end interconnected by a first side and a second side, and the purse ring further comprises;
- a distal roller interconnecting the first side and the second side to bridge the aperture, wherein the first side and the second side of the frame each include a hard facing adjacent the distal roller to reduce wear on the frame;
- a proximal roller interconnecting the first side and the second side to bridge the aperture, wherein the rollers and the sides define a periphery around a passageway for receiving the purse line; and
- a side roller mounted on the first side of the frame adjacent the distal roller to reduce friction between the purse ring and the purse cable/line, with the side roller being transverse to the distal roller.

* * * * *